United States Patent Office 3,104,170
Patented Sept. 17, 1963

3,104,170
METHODS OF PROCESSING POULTRY
John Harold Mahon, Scott Township, Allegheny County, Pa., assignor to Calgon Corporation, a corporation of Pennsylvania
No Drawing. Filed Mar. 13, 1961, Ser. No. 94,977
6 Claims. (Cl. 99—107)

This invention relates to poultry products and methods of processing poultry. The invention is particularly directed to the attainment of superior qualities of taste, odor, flavor and cooked appearance and to the assurance that those qualities will be retained unimpaired through long periods of storage and even through periods of storage far beyond those presently achieved by or, tolerated in the art.

The poultry industry has long been faced with a well recognized but unsolved problem in regard to product preservation and storage which is peculiar to it. While many varied techniques for the long-term frozen storage of food and retailing of precooked frozen foods have been evolved and achieved widespread use in other segments of the food and meat industry, the poultry industry has not been able practically to apply these techniques and achieve a satisfactory pre-cooked product for long term frozen storage. In particular the industry has been unable to prevent the deterioration of poultry evidenced by loss of flavor and development of acrid odors in the meat. These changes are sometimes glaringly evident but even subtle changes of taste, flavor, odor and color have been fatal to the commercial realization of a satisfactory frozen storage of cooked poultry.

It has been recognized for some time that loss of color and greening of cured meats such as ham, bacon, etc. can be inhibited by the use of certain molecularly dehydrated phosphates in the pumping pickle; Hall Patent 2,513,094 issued June 27, 1950. It has also been recognized that control of pH can affect the drip of frozen red meat on thawing; Sair and Cook, Canadian Journal of Research, volume 16, section D, No. 9, September 1938. The oxidative deterioration of fatty acid glycerides in aqueous systems (rancidification) is shown to be inhibited by the use of a mixture of certain phenolic antioxidants and certain molecularly dehydrated phosphates. Such triglyceride systems are represented by lard, bread, cake, doughnuts, and pie crust doughs, salad dressings, fish and vegetable oils and the like; Watts et al. Patent 2,629,664 issued February 24, 1953. This knowledge and the practices contemplated in this art do not deal with the problem of deterioration of cooked poultry and the loss of flavor, taste and color which have plagued the poultry industry. The practices there taught are not applicable to the problems of the poultry field. In the Hall patent the problem of the greening is one that apparently arises from excessive oxidation of the nitroso myochromogen formed in the cured meat by the nitrite curing agents. In Sair and Cook the problem is solely one of water retention in the raw red meat cells. In Watts et al. the problem is oxidative rancidity of fats and oils in aqueous system. Nowhere in this art is there any suggestion of a solution to the problem of loss of flavor, odor, and appearance peculiar to the flesh of poultry, herein called organoleptic depreciation.

I have discovered a treatment for poultry whereby the organoleptic depreciation exemplified by loss of flavor, odor, taste and color in cooked poultry is inhibited and the fresh, moist, plump appearance is maintained in fresh, frozen or refrigerated uncooked poultry. It enables the poultry dealer for the first time to sell at retail after a reasonable storage period pre-cooked frozen poultry products requiring only thawing and warming to be eaten. It also helps to extend the storage duration, or shelf life, of fresh, frozen or refrigerated poultry which has not been pre-cooked, and to give to such poultry the aforestated advantages when later cooked. Among other advantages of my invention are increased tenderness, a bright, fresh, plump appearance in fresh, frozen and refrigerated poultry, and a fresher taste, odor, color and juicier meat which is not subject to the usual severe deterioration, dehydration and loss of fluid on cooking.

In poultry processing it has long been the practice to soak freshly killed poultry in chilled water or mildly saline solutions to rapidly chill the carcass to arrest enzyme and bacterial activity and to increase the weight of the poultry by absorption of water. This is true regardless of whether the poultry is to be sold fresh, refrigerated, frozen or processed into one of the various forms of cooked poultry such as canned poultry, pies, etc. When the poultry is sold fresh it loses much of the absorbed water within a few hours after removal from the soak and loses its plump, firm, fresh moist appearance. This is also true of refrigerated and frozen poultry.

I have discovered that a small amount of polyphosphate within the limits set out hereinbelow, to the poultry meat prior to cooking, preferably while soaking in ice water to cool the poultry, will effectively inhibit deterioration in cooked poultry during frozen or refrigerated storage, as well as maintain the flesh in a fresh, plump, bright appearing condition in the uncooked state. I may use any noncyclic phosphate of an alkali metal selected from the group consisting of sodium and potassium and having a ratio of alkali metal oxide to phosphorous pentoxide of about 0.9 to 1 to about 2.0 to 1. Expressed in another way, I may use any noncyclic polyphosphoric acid salt of an alkali metal selected from the group consisting of sodium and potassium having a ratio of $H_2O$ to $P_2O_5$ of about 0.9 to 1 to about 2.0 to 1. However, it is preferred that partially substituted salts, such as sodium acid pyrophosphate ($Na_2H_2P_2O_7$) be used only in the presence of a fully substituted salt of polyphosphoric acid. Among the compositions useful in my invention including one or more partially substituted alkali metal polyphosphates may be mentioned (a) mixtures of $M_4P_2O_7$ and $M_2H_2P_2O_7$ in ratios of from 1 to 0 to about 1 to 2 by weight, (b) $M_3HP_2O_7$, and (c) mixtures of $M_2H_2P_2O_7$ and $M_3HP_2O_7$ in ratios of from 0 to 1 to about 1 to 2 by weight, where M is one of the alkali metals sodium and potassium. The preferred polyphosphate is sodium tripolyphosphate ($Na_5P_3O_{10}$). Other molecularly dehydrated phosphates which achieve an amazing decrease in deterioration are sodium hexametaphosphate ($NaPO_3)_6$, tetrasodium pyrophosphate ($Na_4P_2O_7$), tetrapotassium pyrophosphate ($K_4P_2O_7$), and potassium tripolyphosphate ($K_5P_3O_{10}$).

I have attempted to use the cyclic phosphates sodium trimetaphosphate and sodium tetrametaphosphate but without success. For some unexplained reason this class of phosphates appears to be completely ineffective for my purpose.

Among the types of poultry to which my invention is applicable may be mentioned chickens, turkeys, geese, capons, Cornish hens, squab, ducks, guinea fowl, and pheasants.

The practice in the poultry industry to soak freshly killed poultry in chilled water or mild saline solution to rapidly chill the carcass, is important to the poultry processor because the soaking process increases the weight of the poultry by 5% or more due to the absorption of water. The poultry may then be cooked or immediately packed for shipment as fresh, refrigerated or frozen poultry. I may utilize this well-recognized soaking procedure for the introduction of polyphosphate in the poultry. It is undesirable, in the practice of my process, to have more sodium chloride in the treating solution than is necessary for imparting flavor to the poultry. The practice of my invention, however, decreases somewhat the absorption of water during the soak. I have found that soaking raw poultry carcasses in a solution of one or more phosphates of the class described is a particularly efficient and convenient method of achieving the desired results. Other means for introduction of the phosphate solution may be utilized, however. For example, the poultry may be sprayed with phosphate solution to permit absorption. However, my discussion herein will be restricted to the chill soaking procedure which is already accepted and universally used in the poultry processing industry.

Table I shows the results of a test run in which freshly killed chickens were cut in half while still warm, and the backbone, neck and sternum removed to produce two identical halves. The halves were labeled, weighed, soaked in various solutions as shown at 40° F., drained and weighed. The dipped halves were placed in polyethylene bags, frozen for 7 days at 0° F., allowed to thaw to 40° F., over a 24-hour period, and weighed. The thawed halves were roasted for 1¼ hours at 330° F., cooled for ½ hour and weighed. The leg from each half was then removed, the meat ground, mixed, and kept in a 40° F. refrigerator for color and flavor, evaluation and analyzed for TBA value. The cooked breasts were wrapped in aluminum foil, refrozen at 0° F. for 13 days, thawed, ground, and analyzed for TBA value. TBA value, or thiobarbituric acid value, is a measure of rancidity based on the method described by E. W. Turner et al., Food Tech. 8, 326 (1954). Numerical values presented throughout this disclosure are relative. A TBA value of 1.0 may be considered the lowest limit of noticeable depreciation of the flesh. Weight percentages are based on weight immediately prior to dipping.

The remarkable effect of my invention is brought out clearly by Table I. The largest cooked weight, it will be seen, occurred in tripolyphosphate treated chicken. This was not, however, due to an increased weight gain at the end of the soak and prior to cooking, as may be seen by comparison to the water controls but apparently to increased retention of the meat juices in the cooked flesh. Cooked chicken soaked in solutions of sodium tripolyphosphate exhibited no significant deterioration either under refrigeration or in the frozen state after the test periods.

The marked difference in TBA value and taste clearly demonstrates the great utility of my invention in making it possible for the first time to extend the (shelf-life) of cooked poultry in frozen and refrigerated storage of more than slight duration. Soaking the chicken in a 4% solution of sodium tripolyphosphate for 6 hours is remarkably effective. Smaller concentrations of this and other polyphosphates for shorter soak periods are also effective though usually to a lesser extent. Dips for as short a time as one hour in a solution of as little as 1% sodium tripolyphosphate have resulted in significant reductions in TBA value.

It should be noted that in all cases where the polyphosphate dip treatment is compared to a plain water dip, the dipped weight of the chicken half soaked in polyphosphate solution is less than that for the half soaked in plain water. In other words, my invention reduces the amount of weight gain ordinarily obtained through the commercial soaking process. Yet, although the dipped weight of polyphosphate-treated chicken is less or no greater than the plain water-dipped chicken, the cooked weight is substantially higher.

The poultry need not be cooked immediately after the phosphate treatment. I have determined that a period of frozen storage or refrigeration between phosphate addition and cooking does not impair the inhibition of deterioration or reduction of cooking loss and, in fact, may even increase the effect as to the reduction cooking loss and inhibition of depreciation.

Significant reductions in cooking loss and deterioration in turkeys are seen in Table II. In this demonstration, two small turkey hens of 6 and 8 lbs. eviscerated weight were cut in half and soaked for 22 hours in water or 6% sodium tripolyphosphate solution held at 40° F. After soaking, the turkeys were immediately cooked by boiling for 45 minutes. The flesh was stripped from the bones, ground, and refrigerated for 5 days at 40° F.

*Table I*

| Chicken No. | Dip solution | Dip period, hrs. | Dipped weight, percent | Thawed weight, percent | Cooked weight, percent | Phosphate effect, percent | Cooked ground flesh, 7 days, 40° F. | | | Whole cooked breast held 13 days at 0° F. | |
|---|---|---|---|---|---|---|---|---|---|---|---|
| | | | | | | | TBA value | Taste | Color | TBA value | Taste |
| 1A | 10% Na₅P₃O₁₀ | 6 | 103.1 | 101.9 | 78.4 | +5.5 | 0.6 | Fresh | Brown | 0.3 | Fresh. |
| 1B | Water | 6 | 105.5 | 102.1 | 74.3 | | 14.0 | Very stale | Greenish | 9.6 | Very stale. |
| 2A | 10% Na₅P₃O₁₀ | 24 | 105.5 | 102.9 | 78.5 | +9.0 | 0.5 | Fresh | Brown | 0.2 | Fresh. |
| 2B | Water | 24 | 107.1 | 102.2 | 72.0 | | 14.5 | Very stale | Greenish | 10.0 | Very stale. |
| 3A | 8% Na₅P₃O₁₀ | 6 | 105.3 | 103.4 | 74.2 | +4.4 | 0.7 | Fresh | Brown | 0.3 | Fresh. |
| 3B | Water | 6 | 107.0 | 102.5 | 71.1 | | 12.5 | Very stale | Greenish | 8.8 | Very stale. |
| 4A | 8% Na₅P₃O₁₀ | 24 | 106.9 | 104.6 | 76.0 | +13.1 | 0.7 | Fresh | Brown | 0.3 | Fresh. |
| 4B | Water | 24 | 108.0 | 103.1 | 67.2 | | 13.0 | Very stale | Greenish | 9.0 | Very stale. |
| 5A | 6% Na₅P₃O₁₀ | 6 | 105.7 | 103.0 | 73.7 | +2.8 | 1.0 | Fresh | Brown | 0.4 | Fresh. |
| 5B | Water | 6 | 107.0 | 102.1 | 71.1 | | 12.0 | Very stale | Greenish | 6.4 | Very stale. |
| 6A | 6% Na₅P₃O₁₀ | 24 | 108.5 | 106.2 | 79.0 | +12.5 | 1.1 | Fresh | Brown | 0.3 | Fresh. |
| 6B | Water | 24 | 110.1 | 104.6 | 70.2 | | 15.0 | Very stale | Greenish | 8.3 | Very stale. |
| 7A | 4% Na₅P₃O₁₀ | 6 | 106.7 | 104.8 | 76.3 | +2.4 | 1.2 | Fresh | Brown | 0.4 | Fresh. |
| 7B | Water | 6 | 108.1 | 103.6 | 74.5 | | 13.0 | Very stale | Greenish | 8.4 | Very stale. |
| 8A | 4% Na₅P₃O₁₀ | 24 | 107.8 | 105.2 | 75.9 | +9.5 | 1.1 | Fresh | Brown | 0.3 | Fresh. |
| 8B | Water | 24 | 108.3 | 104.8 | 69.3 | | 11.0 | Very stale | Greenish | 7.1 | Very stale. |
| 9A | 6% K₄P₂O₇ | 24 | 107.7 | 105.3 | 76.1 | [1] (+8.7) | 0.8 | Fresh, bitter slightly. | Brown | 0.3 | Fresh, bitter. |
| 9B | 6% Na₂H₂P₂O₇ | 24 | 103.8 | 102.0 | 70.4 | [1] (+0.6) | 1.0 | Stale | Light brown | 0.6 | Stale. |
| 10A | 6% K₄P₂O₇ | 24 | 108.1 | 105.8 | 74.7 | [1] (+6.7) | 0.8 | Fresh, bitter | Light brown | 0.3 | Fresh, bitter slightly. |
| 10B | 3% K₄P₂O₇ + 3% Na₂H₂P₂O₇ | 24 | 106.9 | 104.8 | 71.5 | [1] (+2.1) | 0.6 | Fresh, light | Brown | 0.2 | Fresh, bitter. |
| 11A | 3% K₄P₂O₇ + 3% Na₂H₂P₂O₇ | 24 | 106.0 | 103.7 | 77.0 | [1] (+11.0) | 0.6 | Fresh | Brown | 0.4 | Fresh, slightly bitter. |
| 11B | 6% Na₂H₂P₂O₇ | 24 | 101.5 | 99.0 | 67.8 | [1] (−3.1) | 1.5 | Stale | Light brown | 1.3 | Very stale. |
| 12A | 3% K₄P₂O₇ + 3% Na₂H₂P₂O₇ | 24 | 109.7 | 106.7 | 73.4 | [1] (+4.9) | 0.7 | Fresh | Brown | 0.3 | Fresh. |
| 12B | Water | 24 | 109.8 | 104.5 | 71.4 | | 12.5 | Very stale | Greenish | 6.1 | Very stale. |

[1] Relative to average 70.0 for 24 hrs. soaked chicken.

Table II

| Turkey No. | Soak solution | Soaked weight, percent | Cooked weight, percent | Cooked Flesh, percent | Increased flesh yield, percent | Added $Na_5P_3O_{10}$, percent | TBA value 15 days, 40° F. | Flavor 5 days |
|---|---|---|---|---|---|---|---|---|
| 1A | Water | 105.4 | 79.1 | 60.3 | | | 15.0 | V. stale. |
| 1B | 6% $Na_5P_3O_{10}$ | 104.2 | 80.1 | 63.7 | +5.8 | 0.14 | 4.2 | F. stale. |
| 2A | Water | 104.4 | 80.5 | 61.2 | | | 15.0 | V. stale. |
| 2B | 6% $Na_5P_3O_{10}$ | 103.7 | 82.4 | 64.4 | +5.1 | 0.31 | 2.3 | Stale. |

In the raw state after soaking the tripolyphosphate-soaked halves exhibited fresh red colored flesh and fresh yellow resilient skin. On the other hand, those soaked in water exhibited brownish-orange colored flesh and white flabby water-soaked skin. On cooking in boiling water the tripolyphosphate-treated halves were yellow with a fresh sweetish turkey odor. The water-soaked halves were brownish with a less sweet odor. Soaking in 6% tripolyphosphate solution reduced the TBA value significantly.

Other experiments have shown that my invention reduces the loss of juices from poultry flesh not only when the chicken is roasted but also when it is boiled, steamed or otherwise cooked. This is demonstrated in Table III. The freshly killed chicken halves, were weighed (100% ref. wt.) dipped in the solutions as shown at 40° F., Table III

| Chicken No. | $Na_5P_3O_{10}$ soak solution, percent | Soak period, hours | Soaked weight, percent | Boiled weight, percent | Effect of $Na_5P_3O_{10}$, percent |
|---|---|---|---|---|---|
| 1A | | 22 | 107.6 | 80.0 | |
| 1B | 1 | 22 | 107.1 | 84.5 | +5.6 |
| 2A | | 22 | 108.7 | 81.4 | |
| 2B | 2 | 22 | 108.3 | 85.6 | +5.3 |
| 3A | | 24 | 107.2 | 80.0 | |
| 3B | 3 | 24 | 107.5 | 84.0 | +5.0 |
| 4A | | 24 | 107.3 | 77.7 | |
| 4B | 4 | 24 | 107.0 | 84.6 | +8.9 |
| 5A | | 26 | 112.2 | 82.7 | |
| 5B | 5 | 26 | 110.0 | 88.2 | +6.7 |
| 6A | | 26 | 107.1 | 78.0 | |
| 6B | 6 | 26 | 105.8 | 82.8 | +6.1 |

Table IV

| Chicken No. | No. 1 dip solution 22 hours | Dipped weight, percent | No. 2 dip solution | Dipped weight, percent | Thawing drip, percent | Thawed weight, percent | Cooked weight, percent | TBA value Cooked ground meat 7 days at 40° F | TBA value intact cooked breast 14 days at 0° F |
|---|---|---|---|---|---|---|---|---|---|
| 1A | Water | 105.9 | | | 3.1 | 102.8 | 76.8 | 15.0 | 9.0 |
| 1B | 6% hexameta [1] | 105.3 | | | 1.0 | 104.3 | 76.1 | 8.4 | 0.4 |
| 2A | Water | 106.9 | | | 4.1 | 102.3 | 77.0 | 14.0 | 8.1 |
| 2B | 6% tripoly [2] | 104.8 | | | 0.9 | 103.9 | 81.8 | 1.0 | 0.2 |
| 3A | Water | 109.6 | | | 4.9 | 104.7 | 77.5 | 13.0 | 7.4 |
| 3B | 3% N pyro [3] | 106.4 | | | 2.0 | 104.4 | 81.1 | 2.6 | 0.3 |
| 4A | Water | 106.0 | | | 3.9 | 102.1 | 68.8 | 15.0 | 7.5 |
| 4B | 6% 50/50 N/A pyro [4] | 105.5 | | | 1.5 | 104.0 | 75.0 | 1.5 | 0.2 |
| 5A | Water | 107.5 | Water (¼ hr.) | 107.5 | 5.9 | 101.6 | 71.8 | 13.0 | 6.6 |
| 5B | do | 106.0 | 15% tripoly (¼ hr.) | 105.4 | 1.5 | 103.9 | 78.0 | 4.2 | 0.3 |
| 6A | do | 109.0 | Water (1 hr.) | 109.9 | 6.3 | 103.6 | 73.5 | 13.0 | 6.3 |
| 6B | do | 107.0 | 15% tripoly (1 hr.) | 106.3 | 1.6 | 104.7 | 77.7 | 1.5 | 0.2 |

[1] $(NaPO_3)_6$.  [2] $Na_5P_3O_{10}$.  [3] $Na_4P_2O_7$ practical saturation at 40° F.  [4] 3% $Na_4P_2O_7$, 3% $Na_2H_2P_2O_7$.

drained, weighed and cooked for 30 minutes in rapidly boiling water. After removal from the boiling water, the chicken halves were cooled for one hour before being weighed. The cooked flesh removed from the bones is recorded as "Boiled Flesh."

Table IV demonstrates that my invention is remarkably effective even after the poultry has already been treated with the long water soak now in widespread use in the industry. In this test, a group of freshly killed chickens were halved as in previously described tests, and soaked for 22 hours in water. Two of the sets were then subjected to an additional short soak in a solution of sodium tripolyphosphate. The table shows that as little as 15 minutes soak in 15% sodium tripolyphosphate brings about a great reduction in TBA values in both refrigerated and frozen cooked flesh. In this demonstration, the chickens were roasted for 1¼ hours in a 330° F. oven after being held at 0° F. for 14 days. After cooking, the breasts were held for an additional 14 days at 0° F., while the leg flesh was ground and refrigerated for 7 days at 40° F. Results are also shown for sodium hexametaphosphate, tetrasodium pyrophosphate, and a 1 to 1 (by weight) sodium acid pyrophosphate-tetrasodium pyrophosphate mixture.

I have found that more than about 0.1% and preferably more than 0.3% of molecularly dehydrated phosphate should be added to the treated flesh in order to attain the advantages of my invention. Lesser amounts show some of the effects and will retard organoleptic depreciation for short periods of time but I do not recommend such lesser amounts. Table V shows the results of varying added phosphate in the poultry flesh and varying concentrations of soak solutions.

I have also found that a polyphosphate soak solution reduces the exuding of fluid from uncooked chicken which is stored in a refrigerated environment after soaking. The reduction in amount of exudate correspondingly reduces the spread of bacteria and hence delays bacterial spoilage during refrigerated storage. Exudate over a 6–7 day period was reduced from 17–19 ml. to only 1–4 ml. per half chicken. After 5 days' storage, polyphosate-treated chicken was far fresher in appearance, odor and taste than that soaked in plain water. Similarly the treatment reduces the loss of fluid (drip) on thawing of frozen poultry.

The effect of my treatment on fresh poultry is strikingly evident to the ordinary person. Chicken halves soaked in water in the usual manner were compared with chicken halves soaked in a 6% solution of sodium tripolyphosphate, both at 40° F. for 16 hours. The halves soaked in plain water absorbed more water and at the end of 4 hours retained more water. However, at the end of 4 hours the water soaked halves had lost their pink color, and had slumped to a dull, soggy slack looking appearance. The treated halves had remained firm, pink and looked as fresh as when killed.

It is to be distinctly understood that my invention is not limited to the presently preferred methods of practicing it described herein. It may be otherwise variously practiced within the scope of the following claims.

thereof, which solution is free of sodium chloride in amounts above that which may be added for flavor.

4. The method of treating poultry in the raw state to assure against organoleptic depreciation, in the cooked state, of its otherwise transient fresh cooked aroma, taste and texture which comprises treating it in the raw state by introducing into the raw tissue more than about 0.1% of a mixture of $M_2H_2P_2O_7$ and $M_3HP_2O_7$ in a ratio of from about 0:1 to about 1:2 by weight where M is at least one alkali metal selected from the group consisting of sodium and potassium through the medium of an aqueous solution thereof, which solution is free of sodium Table V

| Chicken No. | Soak Solution 17 Hours | Soaked weight, percent | Thawed weight 7 days, percent | Thawing drip, percent | Cooked flesh, percent | Increased flesh yield,[1] percent | Added tripoly, percent | TBA value 7 days, 40° F. |
|---|---|---|---|---|---|---|---|---|
| 1A | Water | 106.2 | | | 53.2 | | | 12.0 |
| 1B | 1% tripoly | 109.3 | | | 56.6 | +6 | 0.04 | 3.9 |
| 2A | Water | 107.1 | | | 52.3 | | | 13.0 |
| 2B | 3% tripoly | 107.9 | | | 57.1 | +9 | 0.34 | 2.1 |
| 3A | Water | 106.7 | | | 52.3 | | | 10.0 |
| 3B | 5% tripoly | 106.6 | | | 60.9 | +16 | 0.48 | 0.8 |

SOAKED CHICKEN FROZEN 6 DAYS AT 0° F.; THAWED OVERNIGHT TO 40° F. BEFORE COOKING

| 7A | Water | 106.6 | 102.0 | 4.6 | 53.4 | | | 10.5 |
|---|---|---|---|---|---|---|---|---|
| 7B | 1% tripoly | 106.6 | 103.1 | 3.5 | 57.2 | +7 | 0.05 | 9.6 |
| 8A | Water | 106.7 | 102.1 | 4.6 | 54.0 | | | 10.5 |
| 8B | 3% tripoly | 106.2 | 104.8 | 1.4 | 60.6 | +12 | 0.34− | 2.9 |
| 9A | Water | 106.8 | 102.0 | 4.8 | 46.9 | | | 8.2 |
| 9B | 5% tripoly | 105.2 | 104.9 | 1.3 | 58.6 | +25(?) | 0.58 | 0.6 |

[1] Water-treated sample taken as 100% cooked meat yield.

I claim:

1. The method of treating poultry in the raw state to assure against organoleptic depreciation, in the cooked state, of its otherwise transient fresh cooked aroma, taste and texture which comprises treating it in the raw state by introducing into the raw tissue more than about 0.1% of a fully substituted non-cyclic phosphate of at least one alkali metal selected from the group consisting of sodium and potassium having a ratio of alkali metal oxide to $P_2O_5$ from about 0.9:1 to about 2:1 through the medium of an aqueous solution thereof, which solution is free of sodium chloride in amounts above that which may be added for flavor.

2. The method of treating poultry in the raw state to assure against organoleptic depreciation, in the cooked state, of its otherwise transient fresh cooked aroma, taste and texture which comprises treating it in the raw state by introducing into the raw tissue more than about 0.1% of sodium tripolyphosphate through the medium of an aqueous solution thereof, which solution is free of sodium chloride in amounts above that which may be added for flavor.

3. The method of treating poultry in the raw state to assure against organoleptic depreciation, in the cooked state, of its otherwise transient fresh cooked aroma, taste and texture which comprises treating it in the raw state by introducing into the raw tissue more than about 0.1% of a mixture of $M_2H_2P_2O_7$ and $M_4P_2O_7$ in a ratio of 0:1 to about 2:1 by weight where M is at least one alkali metal selected from the group consisting of sodium and potassium, through the medium of an aqueous solution chloride in amounts above that which may be added for flavor.

5. The method of treating poultry in the raw state to assure against organoleptic depreciation, in the cooked state, of its otherwise transient fresh cooked aroma, taste and texture which comprises treating it in the raw state by introducing into the raw tissue more than about 0.1% of $M_4P_2O_7$ where M is at least one alkali metal selected from the group consisting of sodium and potassium through the medium of an aqueous solution thereof, which solution is free of sodium chloride in amounts above that which may be added for flavor.

6. The method of treating poultry in the raw state to assure against organoleptic depreciation, in the cooked state, of its otherwise transient fresh cooked aroma, taste and texture which comprises treating it in the raw state by introducing into the raw tissue more than about 0.1% of $M_3HP_2O_7$ where M is at least one alkali metal selected from the group consisting of sodium and potassium through the medium of an aqueous solution thereof, which solution is free of sodium chloride in amounts above that which may be added for flavor.

References Cited in the file of this patent

UNITED STATES PATENTS

| 2,513,094 | Hall | June 27, 1950 |
|---|---|---|
| 2,629,664 | Watts et al. | Feb. 24, 1953 |
| 2,825,654 | Vaupel | Mar. 4, 1958 |
| 2,866,708 | Broquist et al. | Dec. 30, 1958 |
| 2,903,366 | Barnett | Sept. 8, 1959 |
| 2,999,019 | Hopkins et al. | Sept. 5, 1961 |

UNITED STATES PATENT OFFICE

CERTIFICATE OF CORRECTION

Patent No. 3,104,170                      September 17, 1963

John Harold Mahon

It is hereby certified that error appears in the above numbered patent requiring correction and that the said Letters Patent should read as corrected below.

Column 2, line 58, for "sodium" read -- sodium, --; columns 3 and 4, Table I, fourth column, line 10 thereof, for "197.0" read -- 107.0 --; columns 5 and 6, Table IV, sixth column, line 5 thereof, for "4 9" read -- 4.9 --.

Signed and sealed this 14th day of April 1964.

(SEAL)
Attest:

ERNEST W. SWIDER
Attesting Officer

EDWARD J. BRENNER
Commissioner of Patents